2,845,475

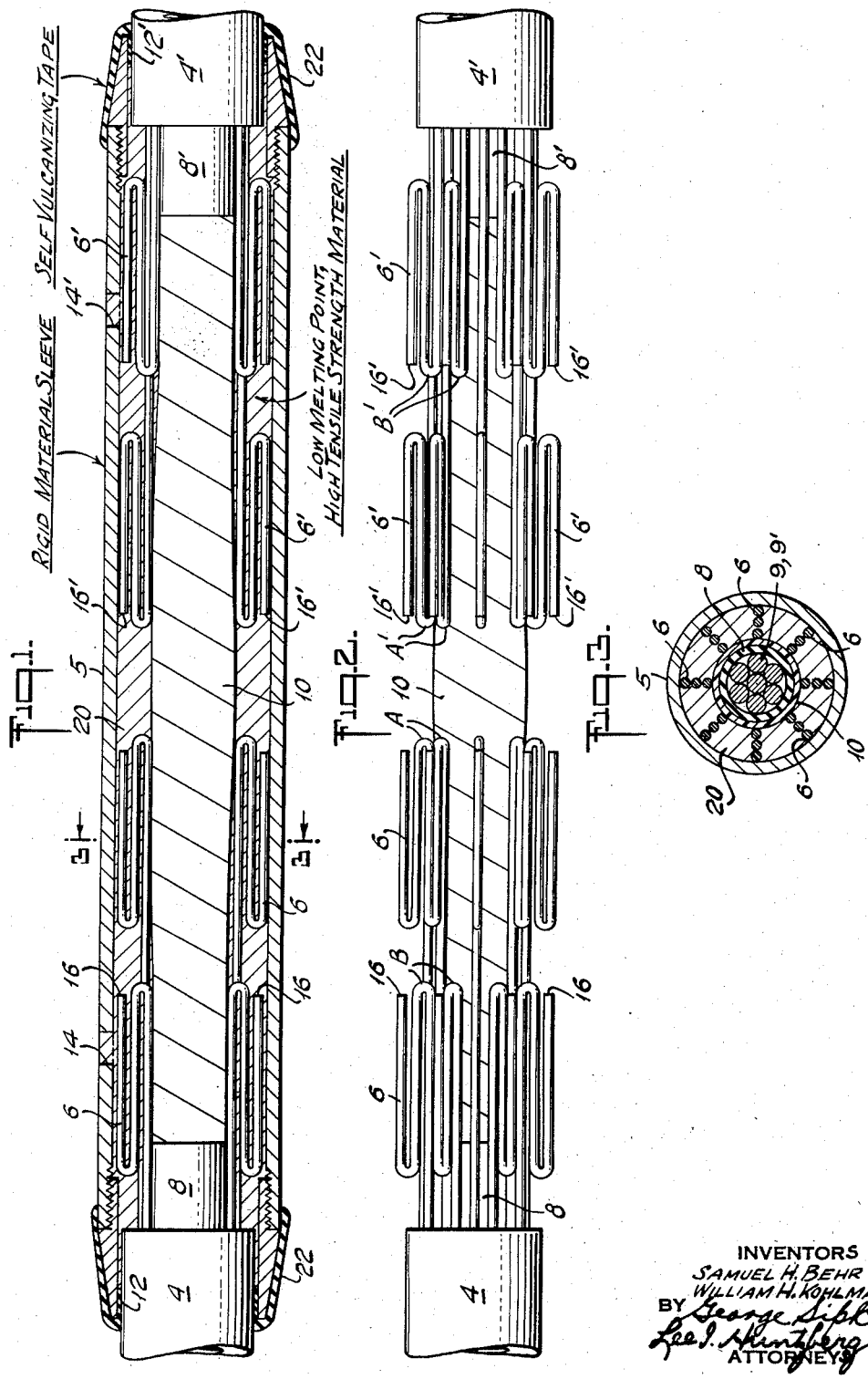

JOINT FOR ARMORED CABLES

Samuel H. Behr, Uniondale, and William H. Kohlmann, Woodhaven, N. Y.

Application June 7, 1955, Serial No. 513,921

17 Claims. (Cl. 174—84)

(Granted under Title 35, U. S. Code (1952), sec. 266)

The invention described herein may be manufactured and used by or for the Government of the United States of America for governmental purposes without the payment of any royalties thereon or therefor.

This invention relates to mechanical cables and to electric cables and more particularly to joints for such cables wherein the inherent strength of the cable is maintained; the joints may be cable-to-cable joints or cable to cable-anchor joints.

Though the description herein is directed to armored electrical cables, the same principles apply to appropriate mechanical cables, e. g. cables having jute cores surrounded by a series of coextensive steel wires.

In those situations where electric cable is to be subjected to severe physical stresses, such as in the case of submarine cable, it has been the common practice to provide armoring therefor. Armoring consists of applying, spirally, strong wire such as galvanized steel wires around the cable. The armoring performs many important functions; the principal ones being the complete encasement of the cable core in order to protect it from abrasion, crushing or other physical damage, the imparting of the greatest portion of the tensile strength which the cable must possess to permit handling and laying thereof and the adding of weight to the cable.

When the ends of two armored cable are joined, it is necessary to splice both the electrical conductor and the armor wires. Heretofore, in splicing the armor wires, it has been found necessary to interleave, longitudinally, the armor wires from the abutting ends of two cables, already electrically spliced, and to "serve" the interleaved armor wires with galvanized steel wire. By "serving" is meant the making of a transverse winding of galvanized steel wire around the armor wires extending a substantial portion in each direction from the junction point of the electrical conductors of the cables. Such method of splicing of armor wire results in several serious deficiencies. First, the splice has been found to have a tensile strength that is approximately 50% or less of the ultimate strength of unspliced cables. Secondly, the splice exhibits great elongation. The elongation is essentially due to the virtual impossibility of removing the slack from the armor wires when a splice is so prepared. As a consequence of elongation, when the spiced cable is subjected to a tensile stress, the tension is caused to be placed on the connector of the electrical conductors so that at the application of slight tension, the connector "pulls out" with a resultant opening of the electrical circuit. Thirdly, the armor wire splicing operation being quite complex, it requires the service of a person with mechanical skill and splicing experience. As a result, splices made by this method are not uniform in tensile strength. Fourthly, the galvanized steel armored wires, when used as armoring for submarine cable, have little or no protection from salt water corrosion and are especially susceptible to corrosion at the splice due to the scraping and/or cracking of galvanizing caused by the handling and bending of the wire during the "serving" operation.

It is, accordingly a primary object of the present invention to provide a joint for the armor wires of spliced armored cables which results in a junction of the cables that is sustantially equal in strength to the ultimate strength of the unspliced cable and to provide an armored cable to cable-anchor connection that is substantially equal in strength to the ultimate strength of the armored cable.

It is a further object to provide a joint for the armor wires of spliced armored cables which results in a junction of the cables wherein elongation at the junction is substantially less than that resulting from junctions made by known methods.

It is another object to provide a joint for the armor wires of spliced armored cables which results in a junction that is watertight, thereby protecting the armored wire from the corrosive effect of salt water and humidity and consequently protecting the electrical conductors from short circuits.

It is another object to provide a joint for the armor wire of spliced armored cables which is simple to fabricate, does not require the service of a skilled splicer and is substantially uniformly reproducible.

It is another object to provide a method for preparing the joint set forth in the preceding objects.

Other objects and many of the attendant advantages of this invention will be readily appreciated as the same becomes better understood by reference to the following detailed description when considered in connection with the accompanying drawings wherein:

Fig. 1 is a side elevation partly in section of an embodiment of the present invention in the form of a joint between a pair of armored electric cables.

Fig. 2 is a plan view of the arrangement of rows of armor wire ends in the embodiment of Fig. 1; and Fig. 3 is a section taken along line 3—3 of Fig. 1.

The embodiment shown in the drawings includes the adjacent ends of two armored electric cables which include outer jackets 4 and 4', armor wires 6 and 6' terminating in S-bends 16 and 16', inner jackets 8 and 8', and conductor cores 9, 9'. The conductor cores 9, 9' are electrically spliced with a butt joint so that the diameter of the splice is about the same as that of the conductor cores. The conductor core splice and the adjacent ends of the inner jackets 8 and 8' are covered by tape 10. The ends of the armor wires 6 are in two circular rows to one side of the conductor splice with alternate armor wires in the respective circular rows. The ends of the armor wires 6' are in two circular rows to the other side of the conductor splice with alternate armor wires in the respective circular rows. A rigid sleeve 5 of a hard material such as steel or a resin laminate reinforced with a material such as fibre glass. The sleeve 5 has opening 14 and 14' and terminates in tapered end portions which are bonded at 12 and 12' to the outer jackets 4 and 4'. Self vulcanizing tape 22 reinforces the seal between the ends of sleeve 5 and the outer jackets 4 and 4'. A high tensile strength material 20 completely surrounds the ends of the cables within the sleeve 5, completely occupying all the space around and between the bent ends of the armor wires in their entirety, and between the bent ends and the tape covered conductor cores. The tensile strength of the material 20 is on the order of the tensile strength of the cables.

A method of making the embodiment of the invention shown in the drawing is as follows: sleeve 5 is slipped over one of the two armored cables to be spliced and is placed for convenience a substantial distance from the end thereof so that it will not interfere with the electric conductor splicing operation. The ends of two armored cables are now electrically spliced in a conventional manner such as with a butt joint. Such splicing entails the removal of a portion of the outer jackets 4 and 4', of each cable and the retracting back of the ends of the armor wire, generally designated as 6 and 6' wound about the inner jackets 8 and 8'. The inner ends of the respective jackets are skinned back, the conductors of the respective cables are electrically spliced in a conventional manner, the inner jacket is patched and a tape is wound about the patched inner jacket. Plugs 12 and 12', usually consisting of a self-vulcanizing material such as neoprene are next taped about the outer jackets 4 and 4' adjacent the exposed inner jackets 8 and 8'. A self-vulcanizing material is preferably used as it bonds to the electrical insulation quite readily.

As the next step, the armor wires 6 and 6' which had been retracted to permit the electric conductor splicing operation are replaced along the spliced cables and the ends 16 and 16' thereof are bent back into hooks by hand or by a suitable tool. Such hooked ends are preferably S shaped but various configurations may be made use of. The adjacent ends 16 and 16' of wires are preferably bent in such a manner that alternating wires form two substantially parallel rows of hooked ends on the end portion of each cable and are disposed in peripheral arrangement around the taped inner jacket of the region of the conductor splice. As shown in Fig. 2, rows A and A' are proximal the center of the splice region and rows B and B' are distal thereto. The alternating arrangement between the ends of wires in rows A and B and A' and B' permits the obtaining of the maximum tensile strength at the armor wire junction as it increases the cross-sectional area of the filling material as will be explained further hereinbelow.

Sleeve 5 is now positioned so that it surrounds the electric conductor splice region, the end portions of the sleeve resting on plugs 12 and 12' which embrace outer jackets 4 and 4'. Sleeve 5 consists of a strong rigid material which is substantially resistant to corrosion, stainless steel being a typical example of such material. Where it is desired to effect a saving in weight, sleeve 5 may consist of a reinforced resin laminate or reinforced nylon. In the embodiment shown in Fig. 1, sleeve 5 is shown to be of substantially cylindrical configuration with detachable threaded tapered end portions. Such geometry is desirable so that the ends of sleeve 5 will readily pass over any obstruction in its path. However, it is understood that sleeve 5 may also be of uniform cross-section throughout its length and that each or both of the end portions may be an integral part thereof. Provided in sleeve 5 are openings 14 through which the liquid phase of a filling material 20 may be poured.

The liquid phase of a normally solid low melting point material 20, which may be metallic or nonmetallic and having high tensile strength is now poured into the sleeve filling all the spaces therewithin. Typical examples of low melting point metal alloys of high tensile strength which may be used as material 20 are the bismuth alloys which generally have a melting point within the range of 70–103° C. In the place of metal, there may be used the liquid phase of high tensile strength resins such as epoxy or polyester resins. Such resins have the particular advantage in that upon adding the catalyst to the liquid phase thereof, an exothermic reaction results which generates heat for their thermosetting. The necessity for limiting material 20 to low melting point materials is to insure that the insulation of the cables is not subjected to deleterious high temperatures. Accordingly, material 20 should have a melting point which is lower than the melting point of the insulation. Plugs 12 serve the purpose of confining material 20 within sleeve 5 while it is in the molten state so that material 20 will solidify therewithin without running out at the ends of the sleeve. As an added precaution, the ends of sleeve 5 may be taped as shown at 22 with a partially vulcanized neoprene tape with pressure sensitive polyvinylchloride tape overall. The complete sleeve 5 may be taped in this manner to insure complete protection.

The material 20 resists tensile force applied to the cable joint and thereby prevents pullout of the conductor splice because it is firmly anchored across the conductor splice. The material 20 is anchored to the bent ends of the armor wires 6 and 6' by that surface area of the armor wires which faces away from the conductor splice and by frictional engagement of the armor wires with the material 20. The double bend in the armor wires prevents the armor wires from snaking out of the material 20 when the joint is under tension.

A joint similar to that described above may be made between a cable and a cylindrical device other than another cable, e. g., a cable anchor. The cylindrical device, cable or other, includes an end portion whose diameter is of the same order of magnitude as the core of the cable joined thereto, and also includes another portion adjacent the end portion and having some substantially rigid surface area facing in a direction away from the end portion.

A joint constructed in accordance with the invention has the advantages of high tensile strength at the junction, little or no elongation, is simple, does not require extensive experience and results in uniform joints.

Obviously many modifications and variations of the present invention are possible in the light of the above teachings. It is therefore to be understood that within the scope of the appended claims the invention may be practiced otherwise than as specifically described.

We claim:
1. A high strength connection between one end of a cable having a core and a series of armor wires surrounding the core and coextensive with the core and a substantially cylindrical device including an end portion whose diameter is of the same order of magnitude as the cable core and including another portion adjacent said end portion and having some substantially rigid surface area facing in a direction away from said end portion, said high strength connection comprising; the end of said core affixed end to end to said end portion of said cylindrical device; an S-type bend in the adjacent end of each armor wire and with the plane of each S-type bend substantially parallel to the length of said cable; and a material of tensile strength on the order of the tensile strength of said cable completely surrounding said end of said cable and said end portion and said other portion of said cylindrical device and enveloping and engaging said rigid surface area, and completely occupying all the space around and between said S-type bends in their entirety, and between said S-type bends and said core, and between said portions of said cylindrical device and said S-type bends and defining a substantially cylindrical contour, whereby when tension not exceeding the tensile strength of said cable is applied to said connection, said material extending between said rigid surface area and said S-type bends resists substantially all of the applied tension.

2. A high strength connection as defined in claim 1 wherein the bent ends of said armor wires form two circular rows, each row including the bent ends of alternate armor wires.

3. A high strength connection as defined in claim 1 further including a rigid sleeve surrounding and engaging said material.

4. A high strength connection as defined in claim 1 wherein the liquid phase of said material under ordinary atmospheric conditions occurs at a temperature which is on the order of 100° C.

5. A high strength splice between the end of a first cable and the end of a second cable, each cable having a core and a series of armor wires surrounding the core and coextensive with the core, said high strength splice comprising; the ends of the core of said first cable and of said second cable being affixed to each other; an S- type bend in the end of each armor wire and parallel to the length thereof; and a material of relatively high tensile strength completely surrounding said ends of said cables and completely occupying all the space around and between said ends of said armor wires and said cores and defining a substantially cylindrical contour.

6. A high strength splice as defined in claim 5 wherein the bent ends of the armor wires of each cable form two circular rows, each row including the bent ends of alternate armor wires of one of said cables.

7. A high strength splice as defined in claim 5 further including a rigid sleeve surrounding and engaging said material.

8. A high strength splice as defined in claim 5 wherein the liquid phase of said material under ordinary atmospheric conditions occurs at a temperature which is on the order of 100° C.

9. A high strength splice between the end of a first electrical cable and the end of a second electrical cable, each cable having a conductor core, a series of armor wires surrounding and insulated from said conductor core and coextensive with the core, and a rubber-like jacket around said armor wires, said high strength splice comprising; electrical and mechanical connection of the contiguous ends of said cores; means insulating said connected ends of said cores; an S-type bend in the end of each armor wire and parallel to the length thereof, and a material of relatively high tensile strength completely surrounding said ends of said cables and completely occupying all the space around and between said ends of said armor wires and said cores and overlapping to some extent said rubber-like jackets and defining a substantially cylindrical contour.

10. A high strength splice as defined in claim 9 wherein the bent ends of the armor wires of each cable form two circular rows, each row including the bent ends of alternate armor wires of one of said cables.

11. A high strength spline as defined in claim 9 further including a rigid sleeve surrounding and engaging said material.

12. A high strength splice as defined in claim 9 wherein the liquid phase of said material under ordinary atmospheric conditions occurs at a temperature which is on the order of 100° C.

13. A high strength splice as defined in claim 9 wherein said material is an epoxy resin.

14. A high strength splice as defined in claim 9 wherein said material is a polyester resin.

15. A high strength splice between the end of a first cable and the end of a second cable, each cable having a core and a series of armor wires surrounding the core and coextensive with the core, said high strength splice comprising; one end of the core of said first cable and one end of the core of said second cable being affixed to each other; an S-type bend in the adjacent end of each armor wire with the plane of each S-type bend being substantially parallel to the length of the respective cable; and a material of relatively high tensile strength completely surrounding said ends of said cables and completely occupying all the space around and between said S-type bends in their entirety, and between said S-type bends and said cores and defining a substantially cylindrical contour.

16. A high strength splice between the end of a first cable and the end of a second cable, each cable having a core and a series of armor wires surrounding the core and coextensive with the core, said high strength splice comprising; one end of the core of said first cable and one end of the core of said second cable being affixed to each other; the adjacent end of each armor wire doubled back upon itself and the free end of the doubled back portion defining an abrupt bend relative to the remainder of the doubled back portion to define an angle of less than ninety degrees therebetween; and a material of relatively high tensile strength completely surrounding said ends of said cables and completely occupying all the space around and between said bent ends in their entirety, and between said bent ends and said cores and defining a substantially cylindrical contour.

17. A high strength connection between one end of a cable having a core and a series of armor wires surrounding the core and coextensive with the core and a substantially cylindrical device including an end portion whose diameter is of the same order of magnitude as the cable core and including another portion adjacent said end portion and having some substantially rigid surface area facing in a direction away from said end portion, said high strength connection comprising; the end of said core affixed end to end to said end portion of said cylindrical device; the adjacent end of each armor wire doubled back upon itself and the free end of the doubled back portion defining an abrupt bend relative to the remainder of the doubled back portion to define an angle of less then ninety degrees therebetween; and a material of tensile strength on the order of the tensile strength of said cable completely surrounding said end of said cable and said end portion and said other portion of said cylindrical device and enveloping and engaging said rigid surface area, and completely occupying all the space around and between the bent ends in their entirety, and between said bent ends and said core, and between said bent ends and said portions of said cylindrical device, and defining a substantially cylindrical contour whereby when tension not exceeding the tensile strength of said material is applied to said connection, said material extending between rigid surface area and said bent ends resists substantially all of the applied tension.

References Cited in the file of this patent

UNITED STATES PATENTS

| | | |
|---|---|---|
| 517,338 | Garland | Mar. 27, 1894 |
| 2,043,341 | Turechek | June 9, 1936 |
| 2,266,357 | Cooke | Dec. 16, 1941 |

FOREIGN PATENTS

| | | |
|---|---|---|
| 836,729 | France | Oct. 25, 1938 |